United States Patent [19]

Gillin et al.

[11] 4,237,116

[45] Dec. 2, 1980

[54] COMBINATION OF THIOPEPTIN AND RUMENSIN TO IMPROVE RUMINANT FEED EFFICIENCY

[75] Inventors: James Gillin, Westfield; David P. Jacobus, Princeton, both of N.J.

[73] Assignee: Merck & Co., Inc., Rahway, N.J.

[21] Appl. No.: 31,660

[22] Filed: Apr. 19, 1979

[51] Int. Cl.³ .................... A61K 35/00; A61K 37/00
[52] U.S. Cl. .................................... 424/117; 424/177
[58] Field of Search ............................... 424/177, 117

[56] References Cited

U.S. PATENT DOCUMENTS

| | | | |
|---|---|---|---|
| 3,501,568 | 3/1970 | Haney | 424/115 |
| 3,761,589 | 9/1973 | Miyairi et al. | 424/117 |
| 3,937,836 | 2/1976 | Raun et al. | 424/283 |
| 4,061,732 | 12/1977 | Muir et al. | 424/177 |

FOREIGN PATENT DOCUMENTS 48-19432  6/1973  Japan ........................ 424/117

*Primary Examiner*—Frederick E. Waddell
*Attorney, Agent, or Firm*—David L. Rose; Harry E. Westlake

[57] ABSTRACT

Combinations of thiopeptin and rumensin are shown to synergistically increase the feed efficiency of ruminant animals. The combination is orally administered to ruminant animals in the feed of the ruminanat or in an orally administered unit dosage form. The combination of thiopeptin and rumensin has a greater effect than the control animals given no medication, and greater than animals given either drug alone.

2 Claims, No Drawings

COMBINATION OF THIOPEPTIN AND RUMENSIN TO IMPROVE RUMINANT FEED EFFICIENCY

BACKGROUND OF THE INVENTION

Thiopeptin is a group of sulfur-containing peptide antibiotic which is isolated from the fermentation broth of *Streptomyces tateyamensis*. The antibiotic is disclosed in U.S. Pat. No. 3,761,587 to Miyari et al along with the preparation thereof by microbiological fermentation. The compound is described as having utility as a growth permittent, particularly in fowl and swine. Thiopeptin is also described as having utility in the prevention of lactic acidosis, a digestive disorder in ruminants, in U.S. Pat. No. 4,061,732 to Muir et al.

Rumensin is the sodium salt of monensin and monesin is isolated from the fermentation broth of *Streptomyces cinnamonensis*. The compounds are described as antiprotozoal, antibacterial and antifungal agents, as a coccidiostat in chickens, and as a feed additive. The compound is described in U.S. Pat. No. 3,501,568 to Haney et al.

SUMMARY OF THE INVENTION

This invention is concerned with the synergistic combination of two compounds, thiopeptin and rumensin. The compounds had been known and used as feed additives prior to the instant invention. It was surprising however, that when the two compounds are combined and orally administered to ruminant animals, the volatile fatty acid (VFA) content of the animals rumen was shifted such that the more efficient propionate was produced in greater quantity and the less efficient volatile fatty acids were produced in lesser quantities. The difference in production of the VFA's was greater than with either compound alone. Thus, it is an object of this invention to describe the combination of thiopeptin and rumensin. A further object is to describe the oral administration of the combination of thiopeptin and rumensin to ruminants. A still further object is to describe compositions containing thiopeptin and rumensin for such administration. Further objects will become apparent from a reading of the following description.

DESCRIPTION OF THE INVENTION

In the course of investigating the efficiency of feed use, the mechanism by which ruminants digest and degrade the components of their feed to form molecules which can be metabolically utilized has been intensively studied. The mechanism of carbohydrate utilization is now well known. Microorganisms in the rumen of the animal ferment the carbohydrate to produce monosaccharides and then degrade the monosaccharides to pyruvate compounds.

Pyruvate is then metabolized by microbiological processes to either acetate or propionate compounds, which may be either acids or other forms of the radicals. Two acetate radicals may be combined thereafter, still in the rumen, to form butyrates.

The animal can utilize butyrate, propionate, and acetate with differing degrees of efficiency. Utilization of these compounds which are collectively known as volatile fatty acid (VFA) occurs after absorption from the gut of the animal. Butyrate is utilized most efficiently, and acetate the least efficiently. However, the relative efficiency of use to butyrate is negated by the inefficiency of the manufacture of butyrate, which must be made from acetate in the rumen.

One of the major inefficiencies in the rumen is in the manufacture of acetate. Since it is made by the degradation of a pyruvate molecule, each molecule of acetate which is produced is accompanied by a molecule of methane. Most of the methane produced is lost through eructation. Since butyrate is made from two molecules of acetate, each molecule of the relatively efficiently used butyrate involves the loss to the animal of two molecules of methane, with all of the associated energy.

Thus, the efficiency of carbohydrate utilization (carbohydrates being the major nutritive portion of ruminant animal's feed) can be increased by treatments which encourage the animal to produce propionate rather than acetate from the carbohydrates. Further, the efficiency of feed use can be effectively monitored by observing the production and concentration of propionate compounds in the rumen. If the animal is making more propionates, it will be found to be using its feed more efficiently. The efficiency is manifested by greater weight gains per feed intake, a reduction in energy losses by methane release, and economic advantages to the animal grower when the animal is sold for consumption.

The synergistic effect of the combination of thiopeptin and rumensin has been observed by administering the two compounds to ruminants on a controlled diet and taking periodic samples of rumen fluid. The amount of each of the volatile fatty acids present in the rumen fluid is measured and compared with that of animals taking no medication and also with animals given only one of the two compounds. This effect has been observed in ruminants on diets of both the high roughage and high grain types.

Specifically, in one such test, ruminants (cattle) on a high roughage diet without medication (control animals) were observed to have 24.16 mole % of propionate in the rumen fluid. Animals given the same diet but with 8.25 ppm of thiopeptin in the diet for 7 days had 25.87 mole % of propionate. Animals given 16.5 ppm of rumensin for 7 days had 25.81 mole % of propionate. Animals given 8.25 ppm of thiopeptin and 16.5 ppm of rumensin had an observed propionate concentration of 29.42 mole %. This effect obviously is greater than either compound alone and indicates that with the higher concentration of propionate, the feed is being more efficiently utilized.

In the same test, the animal's feed was then shifted to a high grain diet and after 2 days rumen samples again taken. The control animals had 21.73 mole % of propionate. The thiopeptin treated animals (at the same dose as the first test) had 27.31 mole % propionate. The rumensin treated animals (again at the same dose as previously) had 25.95 mole % of propionate. The animals treated with the combination of thiopeptin and rumensin (at the same dose as above) had a 33.49 mole % of propionate, thus indicating a very large increase in feed efficiency.

The method of improving the feed utilization of ruminants of this invention comprises orally administering to a ruminant an effective amount of a combination of thiopeptin and rumensin. Of course, the most economically important ruminant animals (those with multiple stomachs, one of which functions as a rumen) are cattle, sheep and goats. The compounds of this invention are administered to ruminants orally generally via the feed, at rates of from about 5 to 20 grams per ton of thiopeptin and from 10 to 30 grams per ton of rumensin.

It has been found that the combination of compounds of this invention increase the efficiency of feed utilization in ruminant animals. The easiest way to administer the compounds is by mixing them in the animal's feed. However, the compounds of this invention can be usefully administered in other ways. For example, they can be incorporated into tablets, drenches, boluses, or capsules, and dosed to the animals. Formulation of the compounds in such dosage forms can be accomplished by means and methods well known in the veterinary pharmaceutical art. Each individual dosage unit should contain a quantity of the combination of feed-efficiency-improving compounds which has a direct relation to the proper daily dose for the animal to be treated.

Capsules are readily produced by filling gelatin capsules with any desired form of the compounds. If desired, the compounds can be diluted with an inert powdered diluent, such as a sugar, starch or purified crystalline cellulose, in order to increase its volume for convenience in filling capsules.

Tablets of the compounds useful in this novel method are made by conventional pharmaceutical processes. Manufacture of tablets is a well-known and highly-advanced art. In addition to the active ingredient, a tablet usually contains a base, a disintegrator, an absorbent, a binder, and a lubricant. Typical bases include lactose, fine icing sugar, sodium chloride, starch and mannitol. Starch is also a good disintegrator as is alginic acid. Surface active agents such as sodium lauryl sulfate and dioctyl sodium sulphosuccinate are also sometimes used. Commonly used absorbents again include starch and lactose, while magnesium carbonate is also useful for oily substances. Frequently used binders are gelatin, gums, starch, dextrin and various cellulose derivatives. Among the commonly used lubricants are magnesium stearate talc, paraffin wax, various metallic soaps, and polyethylene glycol.

This method of increasing the efficiency of feed utilization can also be practiced by the administration of the instant compound as a slow-pay-out bolus. Such boluses are made as tablets are made, except that a means to delay the dissolution of the compound is provided. Boluses are made to release for lengthy periods. The slow dissolution is assisted by choosing a highly water-insoluble form of the compound. A substance such as iron filings is added to raise the density of the bolus and keep it static on the bottom of the rumen.

Dissolution of the compounds is delayed by use of a matrix of insoluble materials in which the drug is embedded. For example, substances such as vegetable waxes, purified mineral waxes, and water insoluble polymeric materials are useful.

Drenches of the instant compounds are prepared most easily by choosing a water soluble or water dispersable form of the compound. If an insoluble form is desired for some reason, a suspension may be made. Alternatively, a drench may be formulated as a solution in a physiologically acceptable solvent such as a polyethylene glycol.

Suspension of insoluble forms of the compounds can be prepared in non-solvents such as vegetable oils such as peanut, corn, or sesame oil; in a glycol such as propylene glycol or a polyethylene glycol; or in water, depending on the form of the compound chosen.

Suitable physiologically acceptable adjuvants are necessary in order to keep the compounds suspended.

The adjuvants can be chosen from among the thickeners, such as carboxymethylcellulose, polyvinylpyrrolidone, gelatin, and the alginates. Many classes of surfactants also will serve to suspend the compounds. For example, lecithin, alkylphenol polyethylene oxide adducts, naphthalene sulfonates, alkylbenzenesulfonates and the polyoxyethylene sorbitan esters are useful for making suspension in liquid nonsolvents.

In addition, many substances which effect the hydrophilicity, density, and surface tension of the liquid can assist in making suspensions in individual cases. For example, silicone antifoams, glycols, sorbitol, and sugars can be useful suspending agents.

The suspendable compound may be offered to the animal grower as a suspension, or as a dry mixture of the compound and adjuvants to be diluted before use.

These compounds may also be administered in the drinking water of the ruminants. Incorporation into drinking water is performed by adding a water soluble or water suspendable form of desired compound to the water in the proper amount. Formulation of the compound for addition to drinking water follows the same principles as formulation of drenches.

The most pratical way to treat animals with the compounds of this invention usable in this novel method is by the formulation of the compound into the feed supply. Any type of feed may be medicated with the instant compounds, including common dry feeds, liquid feeds, and pelleted feeds.

The methods of formulating drugs into animal feeds are well known. It is usual to make a concentrated drug premix as a raw material for medicated feeds. For example, typical drug premixes may contain from about 1 to about 400 g. of drug per pound (454 g.) of premix. The wide range results from the wide range of concentration of drug which may be desired in the final feed. Premixes may be either liquid or solid.

The formulation of ruminant feeds containing the proper amounts of the instant compounds for useful treatment is mainly a matter of arithmetic. It is necessary only to calculate the amount of compound which it is desired to administer to each animal, to take into account the amount of feed per day which the animal eats, and the concentration of compound in the premix to be used, and calculate the proper concentration of the compound in the feed.

All of the methods of formulation, mixing, and pelleting feeds which are normally used in the ruminant feed art are entirely appropriate for manufacturing feeds containing the compounds usable in this method.

It is not intended that the scope of this invention be limited to any particular formulations or methods of administration. The invention is a method of increasing the efficiency of feed utilization by ruminant animals by the oral administration of certain compounds regardless of the method of administration of the compounds.

It is usual to treat economic animals, including ruminants, with a variety of growth promoters, disease preventives, and disease treatments throughout their lives. Such drugs are often used in combination. The novel method may be practiced in combinations with other treatments.

An example of feed rations which may contain the thiopeptin and rumensin of the instant invention are realized in the following exemplary feed rations.

| Ingredients (% by weight) | Ration A (high roughage) | Ration B (high grain) |
| --- | --- | --- |
| Alfalfahay | 77.0 | 14.0 |
| Steam flaked milo | 14.0 | 75.0 |
| Molasses | 6.0 | 6.0 |
| Supplement (a) | — | 2.0 |
| Drug carrier (b) | 3.0 | 3.0 |

| (a) Supplement Ingredients | % by weight |
| --- | --- |
| Ammonium Sulfate | 25.0 |
| Urea | 6.2 |
| Limestone | 34.6 |
| Salt | 33.2 |
| Trace mineral | 0.5 |
| Vitamin A (10 million IU/lb.) | 0.5 |

| (b) Drug Carrier Ingredients | % by weight |
| --- | --- |
| Corn meal | 91.36 |
| Thiopeptin dried (0.35% thiopeptin in cake) mycellial cake | 7.81 |
| Rumensin concentrate (30 g./lb. rumensin in concentrate) | 0.83 |

The foregoing finished feed ration will provide medication at the rate of 7.5 grams of thiopeptin per ton of feed and 15 grams of rumensin per ton of feed.

What is claimed is:

1. A method for increasing the feed efficiency of ruminant animals which comprises orally administering to said ruminant as a part of said ruminant's feed a combination of 8.25 parts per million of thiopeptin, and 16.5 parts per million of rumensin.

2. An orally administered composition useful for incresing the feed efficiency of ruminants which comprises a synergistic combination of 8.25 parts per million of thiopeptin and 16.5 parts per million of rumensin, incorporated within the feed of said ruminants.

* * * * *

UNITED STATES PATENT AND TRADEMARK OFFICE
CERTIFICATE OF CORRECTION

PATENT NO. : 4,237,116
DATED : 12/2/80
INVENTOR(S) : JAMES GILLIN et al

It is certified that error appears in the above-identified patent and that said Letters Patent are hereby corrected as shown below:

On the Title Page in the title delete "RUMENSIN" and insert
--RUMENSIN ®--

On the Title Page in the abstract in lines 1 and 6 delete
"rumensin" and insert --RUMENSIN ®--

In Column 1 in the title delete "RUMENSIN" and insert
--RUMENSIN ®--

In Column 1 line 17 delete "Rumensin" and insert --Rumensin ® --

In Column 1 lines 28, 40, 41 and 43; Column 2 lines 28, 43, 45, 54-55, 57-58, and 64; Column 3 line 2; Column 4 line 66; Column 6 lines 10, 16 and 20, delete "rumensin" and insert --RUMENSIN ®--

In Column 6 line 5 delete "Rumensin" and insert --Rumensin ®--

Signed and Sealed this

First Day of December 1981

[SEAL]

Attest:

GERALD J. MOSSINGHOFF

Attesting Officer     Commissioner of Patents and Trademarks